Oct. 20, 1931. H. E. NORVIEL 1,828,433
SWITCH
Filed May 19, 1930
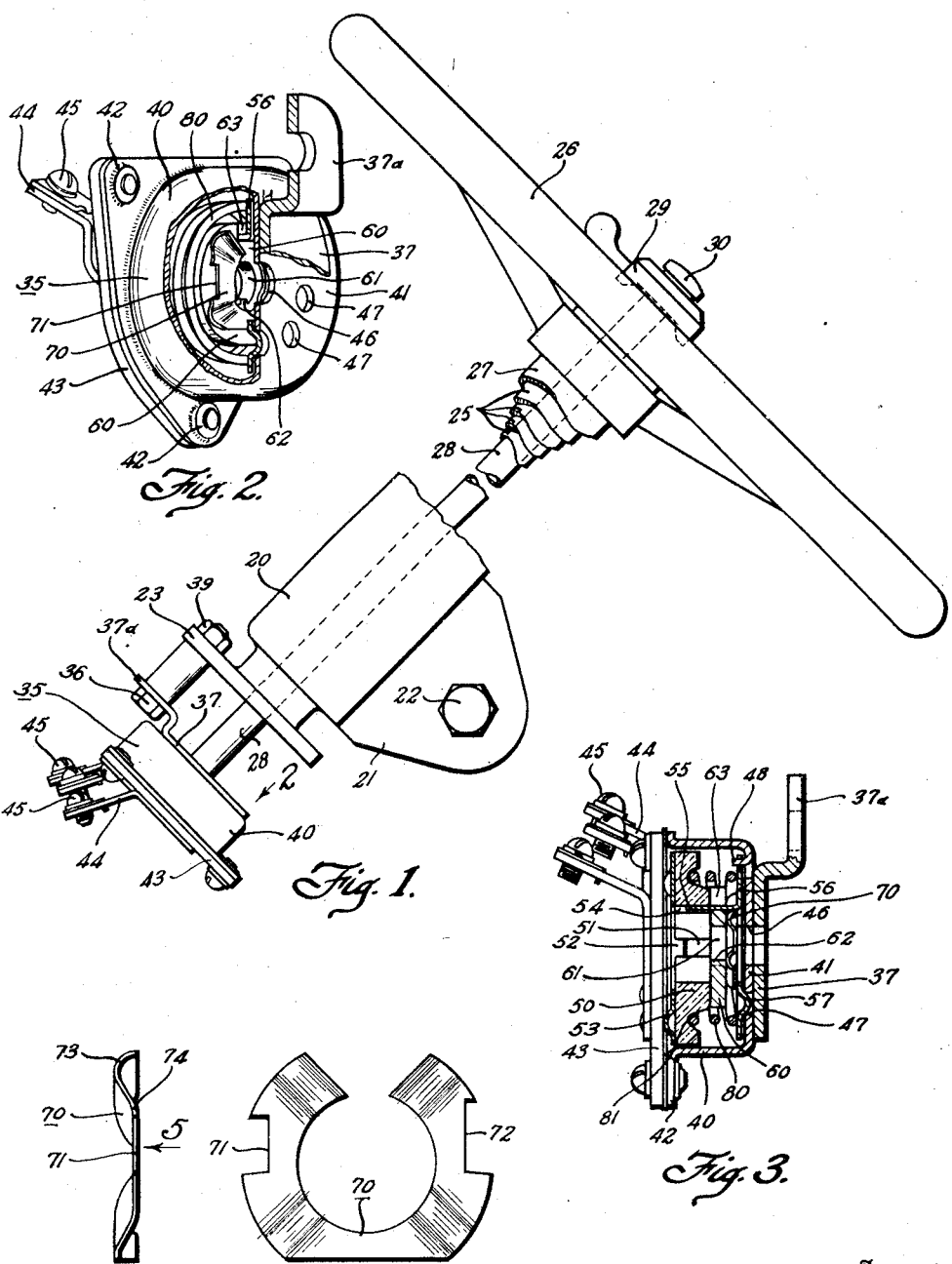
Inventor
Harry E. Norviel
By Spencer Hardman & Fehr
His Attorneys Patented Oct. 20, 1931

1,828,433

UNITED STATES PATENT OFFICE

HARRY E. NORVIEL, OF ANDERSON, INDIANA, ASSIGNOR TO DELCO-REMY CORPORATION, OF ANDERSON, INDIANA, A CORPORATION OF DELAWARE

SWITCH

Application filed May 19, 1930. Serial No. 453,549.

This invention relates to electrical switches adapted for mounting at the lower end of a steering column of an automobile, and has for an object to provide an anti-rattle device for a switch of that structure, and to maintain the parts in position more readily adaptable for assembly with respect to the actuating device.

A further object is to provide a compressible spacer of switch parts, whereby the parts will be maintained in proper relation for perfect cooperation.

A further object of the invention is to improve electrical switches of the rotary or oscillatable type.

A further object of the invention is to improve switches of the indicated type whereby the feeling of operation is more readily discernible.

Further objects and advantages of the present invention will be apparent from the following description, reference being had to the accompanying drawings wherein a preferred embodiment of one form of the present invention is clearly shown.

In the drawings:

Fig. 1 is an elevational view showing the improved switch as mounted upon the steering column of an automobile.

Fig. 2 is an enlarged view of the switch device looking at the back thereof substantially as indicated by the arrow 2 of Fig. 1, and with portions thereof broken away for the purpose of illustrating details of construction.

Fig. 3 is a vertical section through the switch device illustrating certain features of construction.

Figs. 4 and 5 are side elevational and plan views respectively, of portions of the improved switch.

In switches of the class described herein, the prior art devices have been somewhat at fault in that considerable difficulty was experienced in assembling the switch structure on the lower end of the steering column, due to jamming of the cooperating parts, while placing the switch upon the control shaft. Further, when the switch was assembled in this fashion, parts thereof were displaced so that they would respond to vibrations of engine and vehicle movement, manifesting in a disagreeable noise. These and other difficulties were overcome, and in fact eliminated by the structure now to be described.

With particular reference to the drawings, 20 indicates a gear housing portion of a steering column providing an attaching lug 21 by which the structure may be secured to the frame of an automobile structure, through the agency of a bolt 22. The housing terminates in a flange or supporting rib 23 to which the switch structure may be secured. Within the column 20 there may be a plurality of control tubes 25, for operation of variously selected devices, to one of which may be secured the steering wheel 26 at the end of an enclosing sheath or tube 27 connected with the column 20. At the axis of the nest of tubes 25, a switch control rod 28 is provided that terminates at the hub or the steering wheel 26 in a controller manual 29, and may include a horn button 30.

At the lower end of this steering column a switch device 35 is secured, as illustrated in Fig. 1, by means of a bolt 36 passing through an apertured ear 37a of a bracket 37 and through the flange 23 hereinbefore referred to. There it is secured by a nut or lock device 39, and is so held as to be in axial alignment with the control rod 28. The switch device in itself is illustrated in Fig. 2, where portions are broken away to show details of the internal structure, while a cross section thereof is illustrated in Fig. 3. In main, the switch housing comprises a flat cylindrical cup 40 having a bottom wall 41 and the peripheral flange thereof terminating in ears 42 operating to secure a switch back 43 that supports the usual terminal clips 44 with attaching devices 45. The cup bottom 41 is provided with a central apertures 46 and with a plurality of detent apertures 47 concentric with the central aperture and at an adjacent point, a squirt or lug 48 is struck from the bottom of the cup to provide a stop lug for the switch assembly confined therewithin.

The cup 40 may be secured to the bracket 37 in any desired manner, as by spot welding or otherwise, and when so mounted as has been hereinbefore described, the cup is in cooperable relation with the controller 28 as earlier stated. An actuator assembly is contained within the enclosure provided by the cup and the switch back and includes a contact supporting body 50 having a central aperture with adjacent notches or recesses 51 for receiving tongues 52 of a contact plate 53 whereby the contact plate may be rotated upon rotation of said contact carrier 50.

At intervening points about the central recess of the body 50, and substantially in alternation with the notches 51, are provided similar notches 54 which have receiving engagement with tongues 55 of a detent plate 56. The detent plate is centrally apertured coaxial with the aperture 44 of the cup housing, and has disposed about said aperture detent bulges 57 designed for cooperation with the detent apertures 47, and thus driving engagement is maintained between the detent plate 56 and the contact supporting body 50, as well as the contact plate 53.

It will be observed from the illustration in Fig. 3, that the switch housing formed by the back wall 41 and the switch back 43 is greater in thickness than the assembly thus far described, and that the detent plate 56 is in fact spaced from the contact supporting body 50. The purpose of this spacing is to allow the contact actuator assembly and the detent plate to ride over any roughness of surfaces that may obtain in the switch back and bottom respectively. The space also makes for reception of a driving disc 60, centrally apertured at 61 and provided with a key or feather 62 that affords a driving relation with respect to the control rod 28. The drive disc 60 is provided with diametrically opposite notches 63 fitting about the driving tongues 55 of the detent plate 56, whereby rotation of the disc 60 is transmitted to both the detent plate 56 and to the contact supporting body 50, since the tongues 55 are also received by the notches 54 of the body 50.

Interposed between the detent plate 56 and the drive disc 60, there is a cushioning spring, anti-rattle device or collapsible spacer 70 that maintains the driving disc closely adjacent the contact support 50, and facilitates in assembling the switch structure upon the end of the control rod. It has been found preferable to form the anti-rattle device 70 of very thin resilient spring material, and fashion it of the shape exhibited in Figs. 4 and 5, wherein the spring conforms to the greater arc of a flat annulus. The spring has substantially diametrically disposed notches 71 and 72 for reception about the driving tongues 55 of the detent plate, and thence is formed with transverse and radially converging reentrant bends 73 and 74, as illustrated in Fig. 4. In the normal state of formation this renders the spring member of greater thickness, than is the space left between the detent plate 56 and the drive disc 60 as it is assembled. Thus when the spring 70 is interposed between the detent plate 56 and the drive disc 60, and the whole actuator assembly confined within the housing 38 between the cup bottom 41 and the switch back 43, the spring member 70 will be under compression with respect to the reentrant bends 73. By this construction, when the assembly is completed, the drive disc 60 will be maintained in close engagement with the contact support 50, and the space that would normally exist between the actuator assembly and the detent plate, is substantially filled by the resilient bends of the anti-rattle device.

In order to maintain the detent plate 56 and the supporting member 50 in spaced relation, or rather to maintain the contact plate 53 in a cooperable engagement with the switch back 41, a contact urging spring 80 is disposed in an annular recess 81 of the contact supporting block 50 and allowed to engage against the plate 56, so that the contact member 53 and the detent plate will be urged respectively against the opposite parallel portions of the switch enclosure. That is to say, the spring 80 maintains the contact device in cooperable engagement with the switch back, and also the detent plate 56 in cooperable engagement with the detent provisions in the bottom of the cup member.

The switch structure thus provided facilitates the assembly thereof with respect to the steering column 20, and the driving relation with respect to the controller 28, since the drive disc 60 is maintained in direct alignment with the aperture 44 of the cup, and with sufficient rigidity that the key way of the rod 28 may be lined up with the feather 62 of the drive disc, whereupon engagement of the same may be readily made. In assembling the switch structure on the rod 28, if there is any back and forth movement of the switch relative thereto, the spring 70 will readily take up any lost motion that may obtain, and readily return the disc 60 to a position against the contact support 50 keeping the same in perfect alignment therewith. After the assembly is completed the spring 70 also functions to keep the parts within the switch structure from rattling, a fault that has been existent in some of the prior art devices.

While the form of embodiment of the present invention as herein disclosed, constitutes a preferred form, it is to be understood that other forms might be adopted, all coming within the scope of the claims which follow.

What is claimed is as follows:

1. An electric switch comprising in combination, a housing, a contact actuating mechanism therewithin, a driving plate, and means for coupling the same to said contact device, a detent plate, and means disposed between said driving plate and detent plate urging the latter into cooperable relation with the enclosing housing.

2. An electric switch comprising in combination, a housing, a contact actuator assembly within the housing, a driving plate and a detent plate in nonrotative relation with respect to said actuator assembly, but rotatable as a unit within said housing, a switch back closing said housing providing contacts in cooperable relation with said actuator assembly, means normally separating said detent plate and actuator assembly, and means interposed between said driving plate and detent plate whereby lost motion of the same is taken up, and assembly with respect to a driven shaft is facilitated.

3. In an electrical switch the combination comprising, a cup shaped housing having a flat wall providing detent recesses, a detent plate movable over the said wall and providing driving tangs, a driving washer and contact actuator each in nonrotative relation with respect to said detent plate, a closure for said housing providing terminal contacts, and a resilient spacer between said detent plate and said drive disc maintaining said drive disc in engagement with said actuator assembly.

4. In a switch of the class described the combination comprising, a cup shaped housing providing a flat wall and closed by a switch back in parallelism with said cup bottom, a contact actuator assembly within said housing disposed for engagement with said switch back, a detent plate disposed against the bottom of said cup, a drive disc interposed between said contact assembly and said detent plate, and having provisions for driving the same, means urging said contact assembly and detent plate against opposite sides of said switch housing and means disposed between said drive plate and said detent plate absorbing the lost motion between the parts of said assembly.

5. In an electric switch the combination comprising, a housing, a rotatable contact actuator mechanism within the housing, a drive disc for controlling the position of said actuator mechanism, said actuator mechanism and drive disc being of less thickness than the axis of said housing, and a resilient spacer between the drive disc and the housing wall substantially filling the difference in space.

6. In an electric switch the combination comprising, a housing confining an actuator assembly, and means for driving the same, a spring disposed between the driving means and a portion of said housing providing a resilient take-up device for maintaining the mechanism quiet in its operation.

7. In an electric switch the combination comprising, a housing and switch back enclosing a contact actuator assembly, said assembly comprising a contact support and a detent plate disposed against opposite walls of said housing, means engaging said contact support and detent plate for maintaining the parts in the said disposition, a driving disc having driving relation with both said support and detent plate, and means tending to separate the driving disc from the detent plate, whereby the same will be kept in alignment with an actuating rod for the same.

In testimony whereof I hereto affix my signature.

HARRY E. NORVIEL.